US008120309B2

(12) United States Patent
Schein et al.

(10) Patent No.: US 8,120,309 B2
(45) Date of Patent: Feb. 21, 2012

(54) APPARATUS AND METHOD FOR CHARGING A FIRST BATTERY FROM A SECOND BATTERY

(75) Inventors: Herbert Schein, Munningen (DE); Bernd Behnle, Riesburg-Utzmemmingen (DE); Eduard Pytlik, Ellwangen (DE); Dejan Ilic, Ellwangen (DE)

(73) Assignee: Varta Microbattery GmbH (DE)

( * ) Notice: Subject to any disclaimer, the term of this patent is extended or adjusted under 35 U.S.C. 154(b) by 515 days.

(21) Appl. No.: 11/988,224

(22) PCT Filed: Aug. 2, 2006
(Under 37 CFR 1.47)

(86) PCT No.: PCT/EP2006/007624
§ 371 (c)(1),
(2), (4) Date: Jul. 24, 2009

(87) PCT Pub. No.: WO2007/017164
PCT Pub. Date: Feb. 15, 2007

(65) Prior Publication Data
US 2009/0315508 A1 Dec. 24, 2009

(30) Foreign Application Priority Data
Aug. 5, 2005 (DE) .......................... 10 2005 039 083

(51) Int. Cl.
*H02J 7/00* (2006.01)

(52) U.S. Cl. ....................................................... 320/103
(58) Field of Classification Search .................. 320/103
See application file for complete search history.

(56) References Cited

U.S. PATENT DOCUMENTS

| 3,749,905 | A | | 7/1973 | Friedman et al. | |
| 3,947,743 | A | | 3/1976 | Mabuchi et al. | |
| 3,959,706 | A | * | 5/1976 | Mabuchi et al. | 320/103 |
| 5,172,045 | A | | 12/1992 | Takeyasu | |
| 5,717,308 | A | * | 2/1998 | Nishitani et al. | 396/279 |
| 6,022,127 | A | | 2/2000 | Krietzman | |
| 6,186,634 | B1 | * | 2/2001 | Pitts | 362/84 |
| 6,268,709 | B1 | | 7/2001 | Lee et al. | |
| 6,888,337 | B2 | * | 5/2005 | Sawyers | 320/103 |
| 7,567,241 | B2 | * | 7/2009 | King et al. | 345/179 |

FOREIGN PATENT DOCUMENTS

| DE | 2 417 718 A1 | 10/1974 |
| DE | 24 40 218 A1 | 2/1975 |
| DE | 29 37 787 A1 | 4/1981 |
| GB | 2 405 269 A | 2/2005 |
| JP | 02-110946 | 4/1990 |

* cited by examiner

*Primary Examiner* — M'Baye Diao
(74) *Attorney, Agent, or Firm* — DLA Piper LLP (US)

(57) ABSTRACT

A charger that charges at least one first battery from at least one second battery, with the first battery to be charged and the second charging battery arranged in a charger, and with the capacity of the first battery to be charged being substantially less than that of the second charging battery and wherein the charger is in the form of a thin substantially cylindrical pen.

18 Claims, 2 Drawing Sheets

APPARATUS AND METHOD FOR CHARGING A FIRST BATTERY FROM A SECOND BATTERY

RELATED APPLICATION

This is a §371 of International Application No. PCT/EP2006/007624, with an international filing date of Aug. 2, 2006 (WO 2007/017164 A1, published Feb. 15, 2007), which is based on German Patent Application No. 10 2005 039 083.8, filed Aug. 5, 2005.

TECHNICAL FIELD

This disclosure relates to a charger and to an apparatus for charging at least one first battery from at least one, or using at least one, second battery, and to a method for this purpose.

BACKGROUND

Different chargers are generally used to charge a first battery, which can also be regarded as a rechargeable battery. Typical chargers are supplied with a mains voltage, which means that their use is limited to a specific position or is at least associated with use together with plug sockets or fixed supply devices. Furthermore, chargers exist which charge batteries with current from solar cells. These are also portable. However, of course, they use light to operate. Furthermore, they are relatively cumbersome, because of the size of the solar cells.

Problems occur in charging the rechargeable batteries mentioned above in particular when using appliances which have short operating times with rechargeable batteries which times, for example, may be on the order of magnitude of a day, or in some cases more than this, or else in some circumstances considerably less than a day, depending, for example, on the age of the battery or the environmental conditions. In that case, a user is well-advised to carry a supply of charged batteries, which results in a certain amount of inconvenience. In addition, the batteries must be in transport packaging and, in particular, it must also be possible to distinguish between charged batteries and those which have already been discharged. This can lead to confusion, in many cases with a disturbing effect.

Typical appliances of this type are hearing aids. At the moment, these are generally operated by means of primary batteries, so-called "button cells." This results in operating times on the order of magnitude of a few days, or even up to weeks. If the aim is to use rechargeable secondary batteries instead of button cells which can be used only once, for example, of the nickel/metal hydride type, then this results in the operating times mentioned above. It may therefore often be necessary to change or replace the battery during the day while away from home, as well, with the problems that a plurality of charged batteries must be carried as well, or else replacement batteries of sufficient capacity. If the operating time is more than one day, then the replacement problem will in some circumstances occur on the next day, that is to say likewise once again in the middle of the day. For this reason, hearing aids, for example, do not yet at the moment make use of the secondary batteries mentioned above of the nickel/metal hydride type.

It could be advantageous to provide a charger as well as a charging method which is portable and suitable for convenient use.

SUMMARY

We provide a charger that charges at least one first battery from at least one second charging battery, with the first battery to be charged and the second charging battery arranged in a charger, and with the capacity of the first battery to be charged being substantially less than that of the second charging battery and wherein the charger is in the form of a thin cylindrical pen.

We also provide a method for charging a battery with the charger including connecting the battery to the charger, connecting at least one charging battery to the charger, and causing current to flow from the at least one charging battery to the battery to charge the battery.

BRIEF DESCRIPTION OF THE DRAWINGS

Exemplary structures will be explained in more detail in the following text and are illustrated schematically in the drawings, in which.

DETAILED DESCRIPTION

Figure 1:
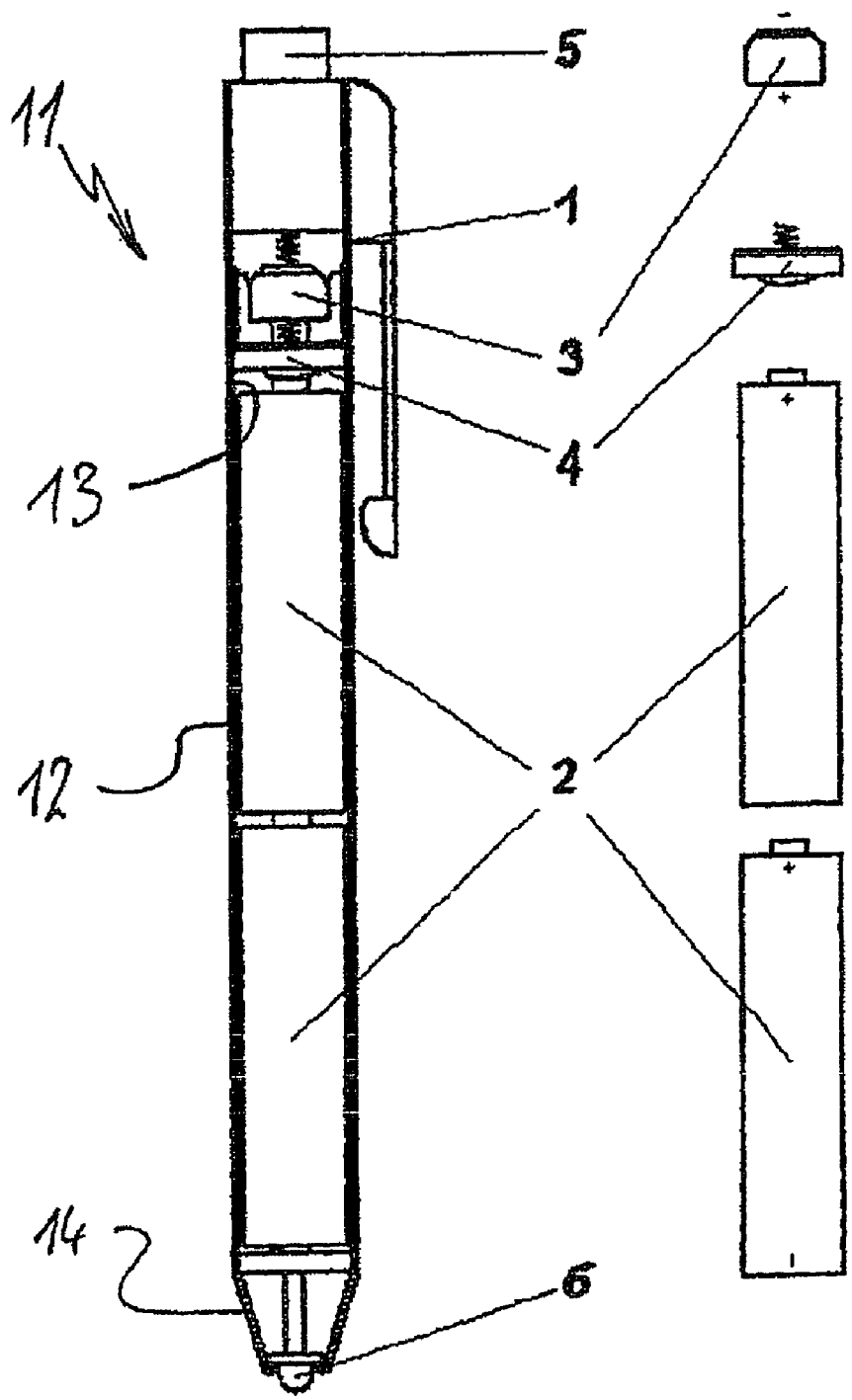
FIG. 1 shows a sectional view of a charger, with individual parts illustrated in an exploded form.

Turning now to the drawings, FIG. 1 shows a charger 11 in a sectional view. Charger 11 has two charging batteries 2 in a housing 12 whose interior forms a battery compartment or a holder 13. These are advantageously primary batteries, for example, alkaline/manganese LR03, LR6. These are commercially available batteries which can be replaced by the user and are arranged one behind the other in the charger 11.

Furthermore, a charging circuit 4 with charging electronics is located directly adjacent to or above this in the holder 13. Charging circuit 4 governs the charging procedure. A battery 3 to be charged is in the form of a button cell and, for example, is of the nickel/metal hydride type, as are advantageously used for hearing aids. This is also arranged in the holder 13 above the charging circuit 4. The housing 12 can be closed by the front cover 14, which can be plugged or screwed on. An LED 6 is provided as an illuminated indication in the cover 14 and can provide information about various operating states.

At the other end, the charger 11 has a switch 5 which, as will be described and explained in the following text, can be used to interrupt contacts, as well as for information about a state of charge or operating state.

The housing 12 is physically small, preferably in the form of a thin cylindrical pen, so it can be conveniently transported, and is available at any time. The clip can also be provided for this purpose. The batteries 2 and 3, as well as the charging circuit 4, are arranged in the single holder 13. Alternatively, holders can be provided for batteries of different sizes.

Figure 2:
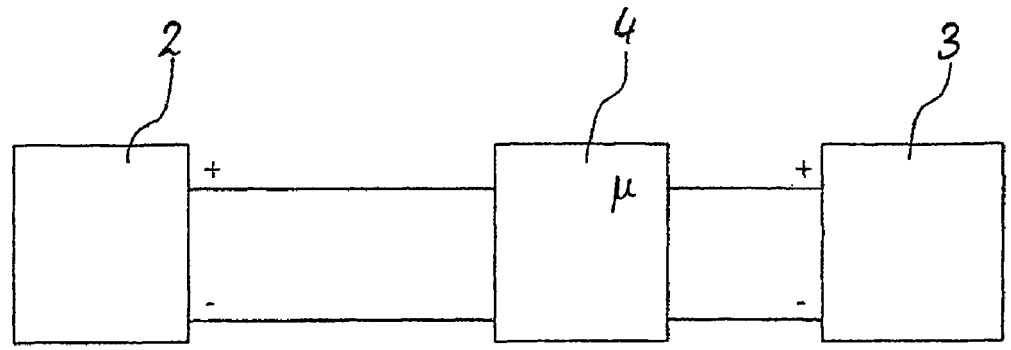
FIGS. 2 to 4 show various circuits for the charger shown in FIG. 1.

FIG. 2 shows a schematic illustration of the electrical circuitry. The charging circuit 4, optionally with charging electronics, is arranged between the battery 3 to be charged and the charging batteries 2. It can thus monitor the charging process.

Figure 3:
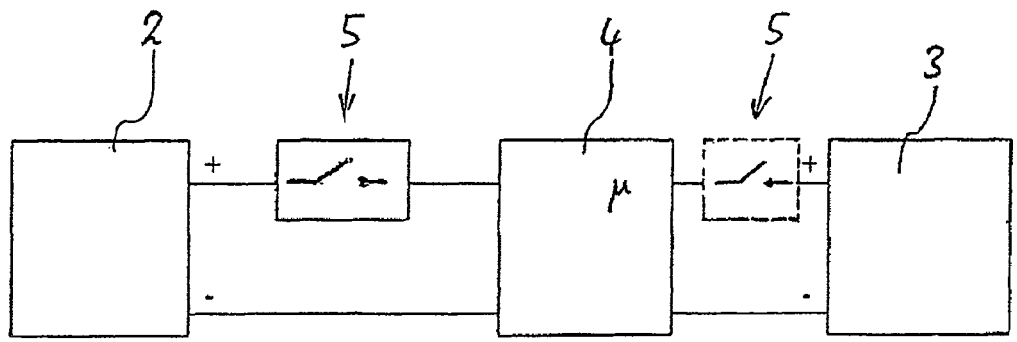

In an extended form shown in FIG. 3, a switch 5 is also provided between the charging circuit 4 and the charging batteries 2. Alternatively or additionally, it can be provided between the charging circuit 4 and the battery 3 to be charged, in some circumstances in the form of a switch with two contacts. This disconnects the charging battery 2 from the charging circuit 4, thus reliably making it possible to prevent quiescent currents from flowing, and energy thus being wasted, when not carrying out a charging process.

Figure 4:
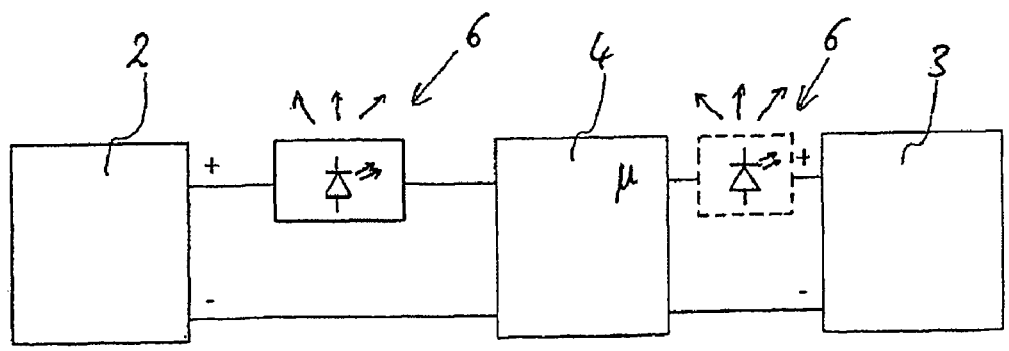

In a similar extension shown in FIG. 4, the LED 6 is arranged between the charging circuit 4 and the charging batteries 2. A further LED can also alternatively or additionally be provided between the charging circuit 4 and the battery 3 to be charged. This can indicate the three operating states "charging," "charging complete" and "charging battery discharged." Combinations with switches 5 and LED 6 can also be provided.

The capacity of the battery 3 to be charged is considerably less than that of the charging batteries 2. A large number of charge cycles can therefore be carried out from the charging batteries 2, typically with 10 to 100 charge cycles being possible. The battery 3 to be charged is a small battery, typically in the form of a button cell. All available electro-chemical systems may be used (for example nickel/metal hydride and various lithium systems). Batteries 3 may also be charged in circuits in parallel and in series.

The intermediate charging circuit 4 and/or charging electronics may carry out various functions. If the voltage of the charging battery 2 is higher than that of the battery 3 to be charged, the charging circuit 4 can limit the charging current. It can end the charging process on reaching a final voltage, or after a defined time. If the voltage of the charging battery 2 is lower than that of the battery 3 to be charged, a charging circuit 4 with a voltage converter function can be used.

Advantages of the charger are:
Convenience: the charger is small, lightweight and easy to use.
Mobility: the illustrated charger can be carried like a ball pen, and is therefore ready to use at any time.
Reliability: a hearing aid user has a charged battery or button cell 3 available for use at all times. This allows hearing without interruption.
Availability: replacement charging batteries are standard, and are therefore available at low cost throughout the world. The battery 3 is likewise standardized, and can be used for different appliances.

NUMERICAL EXAMPLES

Example 1

Two charging batteries 2 of the alkaline/manganese LR03 type and with a capacity of 1000 mAh are connected in series. The battery 3 to be charged is of the NiMH size PR48 type, with a capacity of 30 mAh. The charging circuit 4 connected between them limits the current to 6 mA (corresponding to 0.2 CA). The battery 3 to be charged is charged in 6 hours using this circuit, that is to say 28 charging processes can be carried out with one set of charging batteries 2.

Example 2

Three charging batteries 2 of the alkaline/manganese LR03 type and with a capacity of 1000 mAh are connected in series. The aim is to charge two button cells 3 of the NiMH size PR48 type with a capacity of 30 mAh, in series. The charging circuit 4 connected between them limits the current to 6 mA (corresponding to 0.2 CA). The battery 3 to be charged is charged for 6 hours in this circuit, and 28 charging processes can be carried out with one set of charging batteries 2.

Example 3

Two charging batteries 2 of the alkaline/manganese LR6 type and with a capacity of 2400 mAh are connected in series. The battery 3 to be charged is of the NiMH size PR48 type with a capacity of 30 mAh. The charging circuit 4 connected between them limits the current to 6 mA (corresponding to 0.2 CA). The battery 3 to be charged is charged for 6 hours in this circuit, and 66 charging processes can be carried out with a set of charging batteries 2 such as these.

Example 4

Two charging batteries 2 of the nickel/metal hydride HR03 type and with a capacity of 700 mAh are connected in series. The battery 3 to be charged is of the NiMH size PR48 type, with a capacity of 30 mAh. The charging circuit 4 connected between them limits the current to 6 mA (corresponding to 0.2 CA). The battery 3 to be charged is charged for 6 hours in this circuit, and 19 charging processes can be carried out. The charging batteries 2 will then need to be recharged.

Example 5

A charging battery 2 of the alkaline/manganese LR03 type is used, with a capacity of 1000 mAh. Two button cells as batteries 3 of the NiMH size PR48 type and with a capacity of 30 mAh each, connected in series, are intended to be charged. The charging circuit 4 connected between them converts the voltage to a value of 3 V, and limits the current to 6 mA (corresponding to 0.2 CA). The batteries 3 to be charged are charged for 6 hours in this circuit, and 13 charging processes can be carried out with one charging battery 2.

The invention claimed is:

1. A charger that charges at least one first battery from at least one second charging battery, with the first battery to be charged and the second charging battery arranged in a charger, and with the capacity of the first battery to be charged being substantially less than that of the second charging battery, wherein the charger is in the form of a thin substantially cylindrical pen and has a charging circuit which is adapted to the charging voltage and/or of the charging current, and the charging circuit is a component which can be handled on its own for insertion into a battery holder between the first battery to be charged and the charging battery.

2. The charger of claim 1, wherein the first battery to be charged is arranged in a different holder in the charger than the charging battery.

3. The charger of claim 1, further comprising holders provided for different sizes of the first battery to be charged and/or of the charging battery.

4. The charger of claim 1, wherein the first battery to be charged is arranged in the same holder in the charger as the charging battery and the first battery is inserted into the holder in the same manner as the charging battery.

5. The charger of claim 1, wherein the charger is elongated and a plurality of batteries can be arranged one behind the other, and a plurality of charging batteries can be arranged one behind the other.

6. The charger of claim 1, wherein the charging battery has an elongated cylindrical shape.

7. The charger of claim 1, wherein the charging circuit ends the charging process after the first battery to be charged has reached a final voltage or after a defined time has passed.

8. The charger of claim 1, wherein the charging circuit converts voltage with a step-up converter.

9. The charger of claim 1, wherein the charging circuit limits the charging current.

10. The charger of claim 1, wherein the charging circuit has charging electronics for a timer function.

11. The charger of claim 1, wherein a switch for disconnection of the first battery to be charged from the charging battery with switch having an isolating contact as close as possible to one of the two batteries and a positive pole of the charging battery.

12. The charger of claim 1, further comprising an optical indication for operating states of the charger and a state of charge of the first battery to be charged, or of the operating state of the charging battery, in the form of an LED.

13. The charger of claim 12, wherein the optical indication is provided directly adjacent to either the first battery to be charged or to the charging battery, and/or is connected to it.

14. The charger of claim 1, wherein the charger further comprises a clip.

15. A method for charging a battery comprising:
connecting the battery to the charger of claim 1;
connecting at least one charging battery to the charger; and
causing current to flow from the at least one charging battery to the battery to charge the battery.

16. The method of claim 14, further Comprising limiting the current flowing to the battery with the charging circuit.

17. The method of claim 15, further comprising connecting more than one battery to the charger and causing current to flow from the charging battery in series or in parallel to the batteries.

18. The method of claim 15, further comprising indicating that the battery is charged with a display.

* * * * *